Feb. 5, 1946.    F. T. FARFAN    2,394,048
GRINDING MILL
Filed May 11, 1944    2 Sheets-Sheet 1

INVENTOR
FERNAND T. FARFAN
by Fetherstonhaugh & Co.
ATTY.

Feb. 5, 1946. F. T. FARFAN 2,394,048
GRINDING MILL
Filed May 11, 1944 2 Sheets-Sheet 2

INVENTOR
FERNAND T. FARFAN
by Fetherstonhaugh v Co.
ATTY.

Patented Feb. 5, 1946

2,394,048

UNITED STATES PATENT OFFICE 2,394,048

GRINDING MILL

Fernand T. Farfan, Port-of-Spain, Trinidad

Application May 11, 1944, Serial No. 535,151
In Great Britain July 8, 1942

6 Claims. (Cl. 241—108)

The aim of the present invention is to provide mills that are suitable for grinding, crushing, pulverizing or disintegrating a wide variety of materials, and that may be constructed in small sizes so that they can be used without substantial outlay by small traders and manufacturers engaged in various types of business. The materials that the mills are intended to accommodate are cereals and similar granular food material, such as wheat, rice, maize, oats, barley, coffee, pepper, cocoa beans, peanuts, and so forth, or materials such as paint pigments, charcoal, or the ingredients of tooth paste, provided they are not of a very abrasive nature. The materials may be handled in a moist condition as in the preparation of creams, ointments and so forth, or in a dry state, and the mills may be used to disintegrate cakes of materials, such as cotton seed, compressed in a hydraulic press. Moreover, a particular aim of the invention is to provide mills that are very suitable for small manufacturers of chocolate and other cocoa preparations made from "cocoa mass" prepared at a central factory. By "cocoa mass" is meant cocoa beans that have been roasted, ground and moulded into cakes or put into barrels.

The aforesaid aims are achieved, according to the invention, by making the disintegrating or pulverizing elements of a grinding mill in the form of a pair of cones, one contained within the other and arranged to undergo relative rotation about a substantially vertical axis, the material to be ground being introduced between the cones at their upper ends and delivered in a finely comminuted state at their bases or wide ends. Such cones may, if required, be used in conjunction with a further mixing or deducing apparatus, such as one in which the material falling from the cones is pounded by edge-runners. Conveniently the outer cone may be stationary and the inner one arranged to rotate so that the material is ground between a stationary internally conical surface and a rotating externally conical surface.

One of the cones may be mounted to yield, against a spring, away from the other cone. This yielding cone may be the inner rotary cone and, moreover, its position may be positively adjusted in an axial direction so as to vary the minimum clearance between the co-operating conical surfaces. A further spring may be provided to cushion the return of the yielding cone after the passage between the two cones of matter which forces them to separate to an abnormal degree.

In order that the invention may be clearly understood and readily carried into effect one construction in accordance therewith will now be described, by way of example, with reference to the accompanying drawings, in which—

Figure 1:
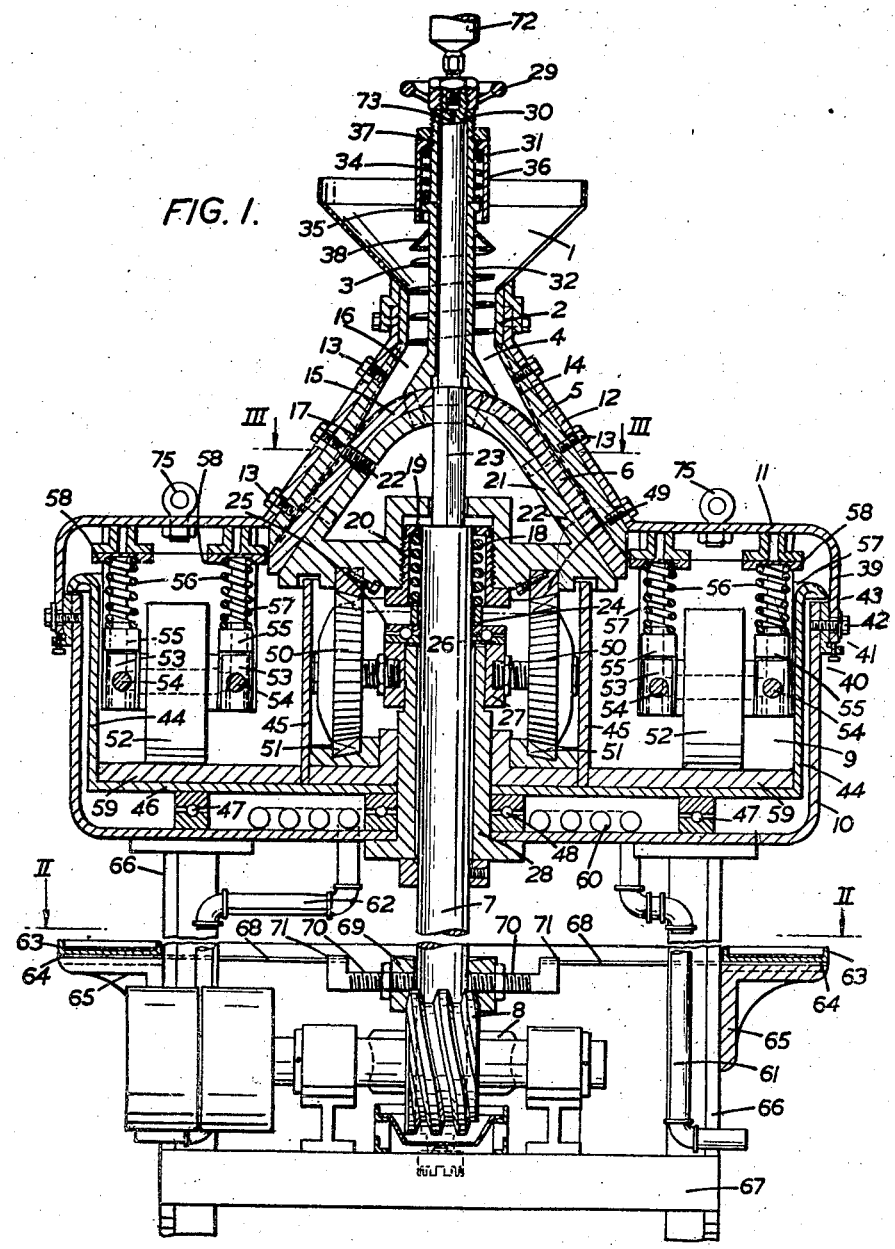
Figure 1 is a vertical section through a grinding mill.

The material to be ground is introduced into a hopper 1 from which it is fed downwards through a tube 2 by a rotating feed screw 3 to a space 4 between a cone 5 and the top of a cone 6. These two cones constitute the primary disintegrating or pulverizing elements in the mill. The cone 5 is stationary and the cone 6 is constantly rotated by a vertical shaft 7 driven through helical gearing 8. The material is delivered from the cones in a finely comminuted state at their bases or wide ends and falls into an annular trough 9 mounted to rotate in a container 10 closed by a cover 11 formed with a central conical portion 12 to which the cone 5 is secured by bolts 13. It will be seen that the conical portion 12 serves also as a support for the tube 2 and hopper 1.

Figure 3:
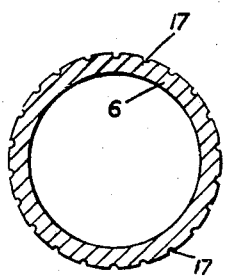
Figures 3 and 4 are cross-sections through certain elements in the mill, the sections being taken on the line III—III in Figure 1 and showing only the configuration of the elements in the plane in which the sections are taken.
Figure 4:
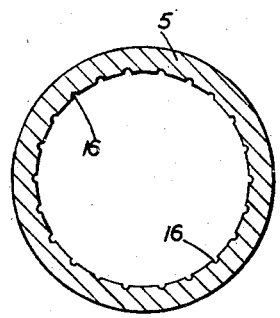

The co-operating surfaces of the cones 5 and 6 are not complementary at their upper ends because the upper end 14 of the inner surface of the stationary cone 5 is tapered more steeply than the remainder of this surface and the cone 6 is dome-shaped at its upper end 15, so that the material to be ground on entering the space 4 is led gently to the active portions of the cones. The stationary cone 5 is formed with longitudinal grooves 16 while the rotary cone 6 is formed with longitudinal grooves 17. These grooves appear in cross-section in Figures 3 and 4, and advantageously these grooves are so formed that they do not pass straight from top to bottom of the cones 5 and 6 but follow a somewhat helical path. The grooves also become shallower towards their lower ends so that they disappear just above the bases of the cones 5 and 6.

It will be appreciated that, when the mill is in operation, the cone 6 may be depressed slightly away from the cone 5, the cone 6, although rotated by the shaft 7, being mounted to slide longitudinally thereon and yield downwards against a compression spring 18. The compression spring thrusts upwardly against a flange 19 on a collar 20 screwed into a conical support 21 over which the cone 6 is secured by studs 22. The shaft 7 is formed with a portion 23 of square cross-section which passes through square openings at the tops of the conical support 21 and the cone 6, so that the rotation is imparted to the cone 6 while the necessary longitudinal movement, as aforesaid, is permitted. The helical spring 18 reacts at its lower end on a collar 24 carried by a plate 25 surrounding the shaft 7 and resting on anti-friction bearings mounted on a stationary plate 26 resting on a collar 27 which is fixed to a stationary sleeve 28 secured to the base of the container 10.

It is the action of the cones 5 and 6 towards their bases that determines the fineness with which the material is ground, and to control this as well as to prevent the passage between the cones from becoming clogged by the disintegrated material, the minimum distance between the cones may be controlled by mechanism comprising a hand-wheel 29, screwed to the upper end 30 of the rotating shaft 7. This hand-wheel bears against the upper end of a sleeve 31 which, in turn, bears on the upper end of a sleeve 32 to which the feed screw 3 is secured and which is formed at its lower end to rest on the top of the rotary cone 6. Thus, by screwing the hand-wheel 29 downwards on the portion 30 of the shaft 7, the cone 6 can be thrust downwards against the action of the spring 18, and this adjustment provides for an initial setting of the inner cone 6 relatively to the outer cone 5 between a point such that the complementary conical surfaces are in contact and a point such that these surfaces are separated by about a quarter of an inch. Of course, when material is fed between the cones, the separation increases or tends to increase and the separation becomes quite substantial when a foreign irreducible body finds its way between the cones 5 and 6. Therefore, to cushion the subsequent upward movement due to the thrust of the spring 18, a compression spring 34 is provided to act between a flange 35 on the sleeve 32 and a flange at the upper end of a skirt 36 which bears against a nut 37 screwed on to the sleeve 31. When the cone 6 is forced downwards by a foreign body, for example, the spring 34 expands, causing the sleeve 32 to follow the cone 6, and then cushions the rebound when this occurs. The skirt 36 serves to prevent the material to be ground, as it is fed into the hopper 1, from fouling the spring 34. The feed screw 3 is formed at its upper end with a conical surface 38 which prevents material from being lodged for a prolonged period on top of the feed screw 3.

The cover 11 is formed with a peripheral flange 39, the lower edge of which rests on set screws 40 screwed into lugs 41 fixed to the stationary container 10. Accordingly the position of the stationary cone 5, which is carried by the cover 11, may be adjusted by adjusting the positions of the set screws 40 in the lugs 41. When the required adjustment has been effected, the cover 11 is locked in position by clamping bolts 42 that pass through slots 43 in the flange 39.

The aforesaid annular trough 9 is defined between walls 44 and 45 extending upwards from a base 46 that can rotate on anti-friction thrust bearings 47 and 48. The trough 9 is rotated through the medium of a ring 49 formed with gear teeth engaging bevel gear wheels 50 mounted on fixed axles secured to the stationary sleeve 27. The ring 49 is fixed to the conical support 21 so that, as the latter rotates, the gear wheels 50 are caused to revolve and the drive is transmitted to a trough 9 through a ring of gear teeth 51 fixed to the trough 9 and in mesh with the gear wheels 50. As the material falls from between the cones 5 and 6 into the trough 9 it is carried round by the latter and subjected to a further grinding process by granite edge-runners 52 mounted to rotate in gimble rings 53 having trunnions 54 journalled in blocks 55 which can rise and fall against the action of compression springs 56, the blocks being mounted to slide in vertical guides 57 secured to the cover 11. The compression springs 56 react against members 58 also carried by the cover 11. The granite edge-runners 52 cooperate with a granite lining 59 at the bottom of the trough.

To enable the material in the trough to be heated, a spiral tube 60 is provided beneath the trough. Heating fluid, such as steam or hot water, is delivered to this spiral tube through a pipe 61 and withdrawn through a pipe 62.

Figure 2:
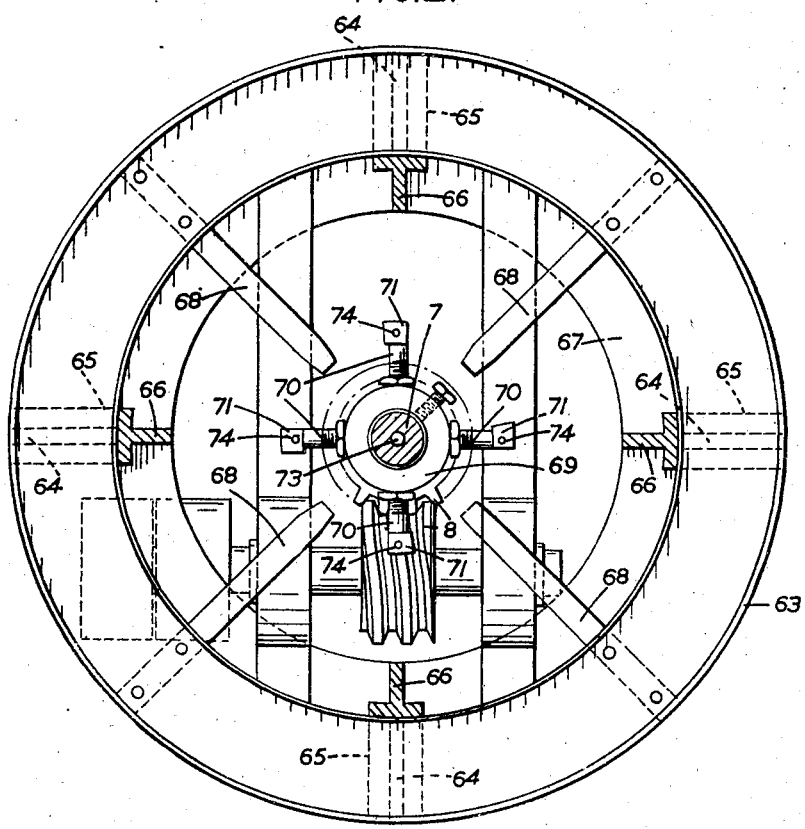
Figure 2 is a cross-section on the line II—II in Figure 1.

When the machine is used to make cocoa preparations from "cocoa mass," a vibrating tray 63 for moulding purposes may be provided beneath the container 10, as shown in Figures 1 and 2. This is an annular tray supported by elongated rubber blocks 64 which are let into the top surfaces of brackets 65 secured to upright frame members 66 which, incidentally, are braced by a ring-shaped frame member 67. The rubber blocks project a little way above the top surfaces of the brackets 65 so as to permit the vibration of the annular tray 63. The vibration is imparted through four arms 68 that project inwards from the tray towards the driving shaft 7 which carries a ring 69 bearing projections 70 formed with cam surfaces 71 which are slightly inclined so as to wipe under the inner ends of the arms 68 and cause the tray to vibrate.

An oil cup 72 is mounted at the top of the shaft 7 and the oil runs down a passage 73 in the shaft 7 from which it is delivered at various points where it is required. Four of these points are the cam surfaces 71, and the oil is delivered from the central passage 73 to outlets 74 in the cam surfaces 71 through passages in the projections 70.

When it is necessary, as for example in the manufacture of chocolate from cocoa press cakes, to reduce the cakes to a certain degree of fineness before mixing in other ingredients, the cakes, roughly broken, are placed in the hopper 1 while the other ingredients are placed in the rotary trough 9 to be mixed with cocoa material after this has been finely ground between the cones 5 and 6.

Alternatively, when it is unnecessary to break down such bulky material as cocoa press cakes, all the ingredients of the mixture are put into the hopper 1. Then mixing takes place both on the way to the trough 9 and in the trough 9. By placing batches one after the other at appropriate intervals into the hopper 1 a substantially continuous grinding and mixing process can be maintained. In certain circumstances, however, it may be necessary to return the material from the trough 9 to the hopper 1 or to pass the material through a second and similar mill. In general it may be said that the primary disintegrating or grinding takes place between the cones 5 and 6, and if the edge-runners 52 are fairly light, they simply serve to mix the material. This mixing may be assisted by ploughs mounted within the trough 9 so as to knead and turn over the material as it is carried round by the trough. Rollers or edge-runners 52 of massive proportions are used when further grinding or disintegrating is required.

The hand-wheel 29 and associated parts enable the action of the cones to be so controlled that products of extreme smoothness may be manufactured. This is particularly important when near-liquid such as creams, ointments, tooth paste, paints and chocolate preparations are being dealt with. The sleeve 32 may be replaced by a sleeve or series of sleeves which instead of carrying a feed screw such as the feed screw 3, carry one or more tools of another kind such as agitators which are of importance when semi-liquid or viscous mixtures are being delivered from the hopper. In fact, wherever there is a risk of the ingredients of a mixture separating to some extent before reaching the cones, such agitators may advantageously be employed. It may, incidentally, also be mentioned that where the material has to be heated, electric heating elements may be employed in place of the spiral tube 60.

The whole assembly is very easily dismantled and cleaned, because by removing the cover 11 together with the outer cone 5 and the hopper 1, for which purpose rings 75 are provided, and removing the oil cup 72 and hand-wheel 29 from the top of the driving shaft 7, the various inner parts become available for inspection and such elements as the sleeve 32 and inner cone 6 can immediately be removed from the shaft.

As an indication of the size of the mill which has been described in detail above, it may be said that the radius of the container is approximately twenty-one inches.

Having now particularly described and ascertained the nature of my said invention and in what manner the same is to be performed, I declare that what I claim is:

1. A grinding mill comprising co-acting grinding elements including a stationary outer cone and an inner cone arranged to rotate within said outer cone, the material to be ground to be introduced between the cones at their upper ends and delivered in a finely comminuted state at their bases or wide ends, means for supporting and rotating said inner cone, a receptacle mounted to rotate about the axis of rotation of said inner cone and to receive therein said finely comminuted material, a gear train through which said receptacle is rotated by said inner cone during rotation of the latter, a plurality of edge runners arranged in said receptacle to rotate about stationary axes and to act on the material delivered to said receptacle and spring biasing means urging said edge runners toward the bottom of said receptacle.

2. A grinding mill as set forth in claim 1 including a stationary casing enclosing said receptacle and provided with a removable cover supporting said outer cone, said edge runners and their spring biasing means being supported from said cover.

3. A grinding mill as set forth in claim 1 in which said gear train comprises a ring gear fixed to rotate with said inner cone, a second ring gear fixed to rotate with the bottom of said receptacle and positioned directly below the first mentioned ring gear and a plurality of pinions meshing with both of said ring gears and mounted to rotate about fixed axes.

4. A grinding mill comprising co-acting grinding elements including a stationary outer cone, an inner cone arranged to rotate within said outer cone, the material to be ground being introduced between the cones at their upper ends and delivered in a finely comminuted state at their bases or wide ends, a vertical shaft on which the inner cone is mounted to rotate with said shaft and to have a limited independent sliding movement in the longitudinal direction of said shaft, means for rotating said shaft, a stationary sleeve through which said shaft extends, said sleeve being positioned below said inner cone, spring means interposed between said inner cone and the upper end of said sleeve and serving to yieldingly support the inner cone so that said inner cone is movable downwardly relative to said shaft and said outer cone by the cone separating action of material passing between said cones, a sleeve slidably mounted on a portion of the shaft extending above said inner cone and having its lower end engaging said inner cone and a spring arranged to act downwardly on said sleeve to cushion the upward return movement of the inner cone under the influence of said first mentioned spring means.

5. A grinding mill comprising co-acting grinding elements including a vertically arranged stationary outer cone and an inner cone arranged to rotate within said outer cone, a vertical shaft on which the inner cone is mounted to rotate and to have a limited vertical sliding movement relative to said shaft and said outer cone, means for rotating said shaft, spring means yieldingly supporting said inner cone and adapted to permit said inner cone to be displaced downwardly on said shaft by the cone displacing action of material passing between said cones, a sleeve slidably arranged on a portion of the shaft extending above the inner cone with the lower end of the sleeve engaging said inner cone, a second sleeve slidably arranged on said shaft above and in contact with said first mentioned sleeve, and a hand wheel threaded on said shaft and bearing against the upper end of said second sleeve.

6. A grinding mill as set forth in claim 5 including a spring encircling the second mentioned sleeve and acting downwardly against a flange provided at the upper end of the first mentioned sleeve, said spring serving to cushion the upward return movement of the inner cone under the influence of the first mentioned spring means yieldingly supporting said cones.

FERNAND T. FARFAN.